US011369060B2

(12) United States Patent
Hillen et al.

(10) Patent No.: US 11,369,060 B2
(45) Date of Patent: Jun. 28, 2022

(54) REMOVABLE AUGER TROUGH

(71) Applicant: CNH Industrial America LLC, New Holland, PA (US)

(72) Inventors: Curtis F. Hillen, Lititz, PA (US); Herbert M. Farley, Elizabethtown, PA (US); Andrews V. Lauwers, Sandusky, OH (US); Robert S. Boyd, III, Flowery Branch, GA (US); Eric L Walker, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 67 days.

(21) Appl. No.: 16/278,564

(22) Filed: Feb. 18, 2019

(65) Prior Publication Data
US 2019/0254234 A1 Aug. 22, 2019

Related U.S. Application Data

(60) Provisional application No. 62/632,011, filed on Feb. 19, 2018.

(51) Int. Cl.
*A01F 12/46* (2006.01)
*A01F 12/44* (2006.01)
*A01D 41/127* (2006.01)

(52) U.S. Cl.
CPC .......... *A01F 12/46* (2013.01); *A01D 41/1276* (2013.01); *A01F 12/44* (2013.01)

(58) Field of Classification Search
CPC ........ A01F 12/44; A01F 12/46; A01F 12/442; A01F 12/184; A01D 41/1276;
(Continued)

(56) References Cited

U.S. PATENT DOCUMENTS 1,375,391 A * 4/1921 Johnson .................. A01F 25/00
49/69
2,334,441 A * 11/1943 Rodrigues ............ A01D 43/003
56/1

(Continued)

FOREIGN PATENT DOCUMENTS

EP 2695507 A1 2/2014
KR 20100067725 A 6/2010

OTHER PUBLICATIONS

Extended European Search Report for EP19157904.4, dated Jul. 16, 2019 (8 pages).

*Primary Examiner* — Thomas B Will
*Assistant Examiner* — Madeline I Runco
(74) *Attorney, Agent, or Firm* — Peter Zacharias; Patrick Sheldrake

(57) ABSTRACT

An agricultural vehicle including at least one threshing rotor and an auger bed located underneath the at least one threshing rotor. The auger bed has a working position and a cleaning position. The auger bed includes a frame, a plurality of augers rotatably coupled to and supported by the frame, and a trough portion moveably connected to the frame. In the working position the bottom surface of the trough portion is positioned underneath the plurality of augers and in the cleaning position the entire trough portion is moved relative to the frame so that the bottom surface of the trough portion is not positioned underneath at least a portion of the plurality of augers, creating an open space underneath the portion of the plurality of augers for allowing an unwanted material to pass therethrough.

15 Claims, 6 Drawing Sheets

(58) Field of Classification Search
CPC .... A01D 41/1261; A01D 12/46; A01D 12/44; A01D 12/442; A01K 5/0258; A01K 5/0107; B65G 65/46; B65G 33/26; B65G 33/06; B65G 33/18
See application file for complete search history.

(56) References Cited

U.S. PATENT DOCUMENTS

| | | | | |
|---|---|---|---|---|
| 2,367,397 A * | 1/1945 | Harlow | ............ | G01N 1/20 73/863.92 |
| 2,995,135 A | 8/1961 | Krum | | |
| 3,101,721 A * | 8/1963 | Arnold | ............ | A01F 12/24 460/75 |
| 3,231,071 A * | 1/1966 | Prentice | ............ | A01K 5/0258 198/671 |
| 3,265,226 A | 8/1966 | Malcolm | | |
| 3,275,125 A * | 9/1966 | Prentice | ............ | A01K 5/0258 198/671 |
| 3,373,871 A * | 3/1968 | Huether | ............ | A01F 12/442 209/284 |
| 3,470,881 A * | 10/1969 | DePauw | ............ | A01F 12/20 460/109 |
| 3,556,108 A * | 1/1971 | Knapp | ............ | A01F 7/06 460/97 |
| 3,568,863 A | 3/1971 | Rohwedder et al. | | |
| 4,466,447 A * | 8/1984 | Hoefer | ............ | A01F 12/52 460/13 |
| 4,720,962 A * | 1/1988 | Klinner | ............ | A01D 43/102 460/105 |
| 5,797,480 A * | 8/1998 | Gaddis | ............ | B60P 1/40 198/672 |
| 6,602,130 B1 * | 8/2003 | Manning | ............ | A01F 12/444 209/30 |
| 6,632,136 B2 * | 10/2003 | Anderson | ............ | A01F 12/448 460/101 |
| 6,988,350 B2 * | 1/2006 | Bennett | ............ | B65B 5/101 53/535 |
| 7,207,165 B2 * | 4/2007 | Crego | ............ | A01F 12/16 367/99 |
| 7,297,051 B1 * | 11/2007 | Schmidt | ............ | A01F 12/00 460/66 |
| 7,395,650 B2 * | 7/2008 | Mossman | ............ | A01D 61/002 56/119 |
| 7,585,213 B2 | 9/2009 | Claerhout et al. | | |
| 7,632,183 B2 | 12/2009 | Schmidt et al. | | |
| 7,934,982 B2 * | 5/2011 | Pope | ............ | A01F 12/52 460/14 |
| 8,628,390 B2 * | 1/2014 | Baltz | ............ | A01F 12/24 460/109 |
| 8,777,706 B2 * | 7/2014 | Farley | ............ | A01D 75/282 460/101 |
| 8,858,310 B2 * | 10/2014 | Cooksey | ............ | A01F 12/46 460/103 |
| 9,288,944 B2 | 3/2016 | Coppinger et al. | | |
| 9,510,513 B2 * | 12/2016 | Wilde Von Wildemann | ............ | A01F 12/52 |
| 9,510,514 B2 * | 12/2016 | Temple | ............ | A01D 41/1261 |
| 9,854,742 B2 * | 1/2018 | Bilde | ............ | A01F 12/44 |
| 2005/0074283 A1 * | 4/2005 | Lee | ............ | E01C 19/405 404/108 |
| 2009/0186674 A1 | 7/2009 | Claerhout et al. | | |

\* cited by examiner

REMOVABLE AUGER TROUGH

FIELD OF THE INVENTION

The present invention pertains to agricultural vehicles and, more specifically, to agricultural vehicles which include an auger trough.

BACKGROUND OF THE INVENTION

An agricultural harvester known as a "combine" is historically termed such because it combines multiple harvesting functions with a single harvesting unit, such as picking, threshing, separating, and cleaning. A combine includes a header which removes the crop from a field and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves and may either fall onto a grain trough which transports the grain to the cleaning system or the grain may fall directly onto the cleaning system. After passing through the cleaning system, the grain is then transported to a grain tank onboard the combine. Material other than grain (MOG), such as straw, from the threshing section proceeds through a straw chopper and out the rear of the combine.

A typical grain trough or auger bed can be located beneath the threshing rotor and may include a bottom trough with augers disposed therein. Overtime, the grain trough may undesirably contain unwanted material, such as MOG or grain from a previous harvesting operation. Some grain troughs may include a cleaning system to help a user cleanout the unwanted material. However, such cleaning systems may have clean-out openings which may be relatively small; making removal of the unwanted material arduous. Thereby, an operator typically must manually move, e.g. brush, blow, or wash, the unwanted material towards the relatively small clean-out openings and out through the openings. Hence, the operator must usually expend considerable time and effort to clean out a grain trough.

What is needed in the art is a cost-effective and efficient cleaning system for removing unwanted material from an auger bed of an agricultural vehicle.

SUMMARY OF THE INVENTION

In one exemplary embodiment provided in accordance with the present invention, an agricultural vehicle has an auger bed which generally includes a frame, a trough portion with a bottom surface which has a selectively closeable opening, and augers disposed within the trough portion. The auger bed may automatically remove the unwanted crop material by reversing the direction of the augers and allowing the unwanted crop material to easily pass through the selectively closable opening.

In another exemplary embodiment provided in accordance with the present invention, an agricultural vehicle includes at least one threshing rotor and an auger bed located underneath the at least one threshing rotor. The auger bed has a working position and a cleaning position. The auger bed includes a frame including a front support member and a pair of side support members connected to the front support member, a plurality of augers rotatably coupled to and supported by the frame, and a trough portion moveably connected to the frame. The trough portion defines a bottom surface such that each auger is at least partially disposed within the trough portion. In the working position the bottom surface of the trough portion is positioned underneath the plurality of augers and in the cleaning position the entire trough portion is moved relative to the frame so that the bottom surface of the trough portion is not positioned underneath at least a portion of the plurality of augers, creating an open space underneath the portion of the plurality of augers for allowing an unwanted material to pass therethrough.

In yet another exemplary embodiment provided in accordance with the present invention, an auger bed for an agricultural vehicle includes a frame having a front support member, a trough portion connected to the frame and having a working position and a cleaning position. The trough portion includes a bottom surface with a plurality of selectively closeable openings therein. The auger bed also includes a plurality of augers being rotatably coupled to and supported by the frame. Each auger is at least partially disposed within the trough portion such that in the working position each the plurality of selectively closeable openings is closed and in the cleaning position each the plurality of selectively closeable openings is exposed, allowing an unwanted material to pass therethrough.

In yet another exemplary embodiment provided in accordance with the present invention, an auger bed for an agricultural vehicle includes a frame having a front support member with a plurality of openings therein, a trough portion connected to the frame, a plurality of augers being rotatably connected to and supported by the frame and at least partially disposed within the trough portion, and a plurality of rotating doors pivotally connected to the front support member of the frame and associated with the plurality of openings in the front support member. Each the rotating door having a first position and a second position. In the first position each the rotating door of the plurality of rotating doors closes a respective opening of the plurality of openings, and in the second position each the rotating door of the plurality of rotating doors pivots to expose the respective opening of the plurality of openings, allowing an unwanted material to pass through the plurality of openings.

An advantage of the exemplary embodiment of the invention is that the auger bed can selectively open or close one or more openings, simultaneously, to more easily remove unwanted material from the auger bed.

Another advantage of the exemplary embodiment of the present invention is that the auger bed can automatically clean out unwanted material from the auger trough by automatically uncovering openings.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
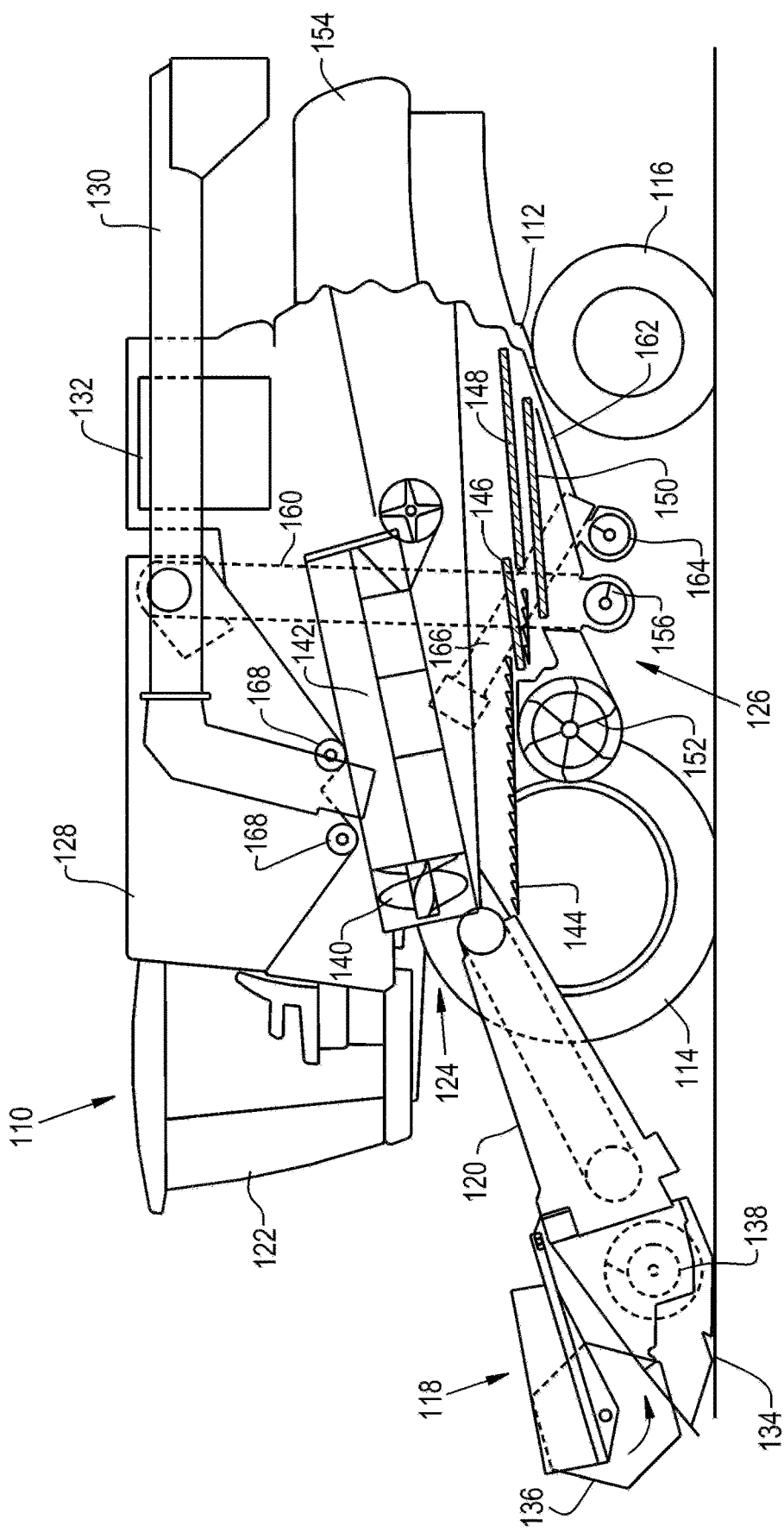
FIG. 1 illustrates a side view of a known agricultural vehicle.

Referring now to the drawings, and more particularly to FIG. 1, there is shown a prior art agricultural harvester in the form of a combine 110, which generally includes a chassis 112, wheels 114,116, a header 118, a feeder housing 120, an operator cab 122, a threshing and separating system 124, a cleaning system 126, a grain tank 128, and an unloading auger 130.

The chassis 112 is supported by the wheels 114, 116. The front wheels 114 can be larger flotation type wheels, and the rear wheels 116 can be smaller steerable wheels. Motive force is selectively applied to the front wheels 114 through a prime mover 132 in the form of a diesel engine 132 and a transmission (not shown).

The header 118 is mounted to the front of combine 110, and the header 118 may include a cutter bar 134 for severing crop material from a field, a rotatable reel 136 which feeds the crop material into the header 118, and an auger 138 which transports the severed crop material toward the feeder housing 120. The feeder housing 120 conveys the cut crop material to threshing and separating system 124, and the feeder housing 120 may be selectively vertically movable using appropriate actuators, such as hydraulic cylinders (not shown).

The threshing and separating system 124 may include a rotor 140 and one or more concave(s) 142. The rotor 140 may be enclosed by and rotatable within the concave(s) 142.

The cut crop material may be threshed and separated by the rotation of the rotor 140 within the concave(s) 142. Larger elements, such as stalks, leaves and the like may be discharged from the rear of combine 110. Smaller elements of crop material including grain and non-grain crop material, including particles lighter than grain, such as chaff, dust and straw, may be discharged through the perforations of the concave(s) 142. The rotor 140 of the threshing and separating system 124 can be a transverse or axial rotor.

As the crop material is processed through threshing and separating system 124, grain may fall onto a grain auger trough 144 or directly onto the cleaning system 126. The auger trough 144 can include multiple augers (not shown) that convey the grain toward the cleaning system 126. In order for the auger trough 144 to be more easily cleaned, the auger trough 144 may include a cleaning device (not shown), such as a small opening, at the forward end of the trough 144. The auger trough 144 may be moved, e.g. oscillated, in order to more efficiently transport the grain.

The cleaning system 126 may include a pre-cleaning sieve 146, an upper sieve 148 (also known as a chaffer sieve or sieve assembly), a lower sieve 150 (also known as a cleaning sieve), and a cleaning fan 152. The fan 152 blows an airstream through the sieves 146, 148, and 150 to remove chaff and other impurities such as dust from the grain by making this material airborne for discharge from a straw hood 154. One or more of the sieves 146, 148, 150 may oscillate to more effectively transport the grain and finer non-grain crop material.

Clean grain falls to a clean grain auger 156 positioned crosswise below and toward the front of lower sieve 150. The clean grain auger 156 may receive the clean grain from each of the sieves 148, 150 of cleaning system 126. Clean grain auger 156 conveys the clean grain laterally to a generally vertically arranged grain elevator 160 for transport to grain tank 128. Tailings from cleaning system 126 fall to a tailings auger trough 162. The tailings are transported via tailings auger 164 and return auger 166 to the upstream end of cleaning system 126 for repeated cleaning action. A pair of grain tank augers 168 at the bottom of grain tank 128 may convey the clean grain laterally within grain tank 128 to the unloading auger 130.

Figure 2:
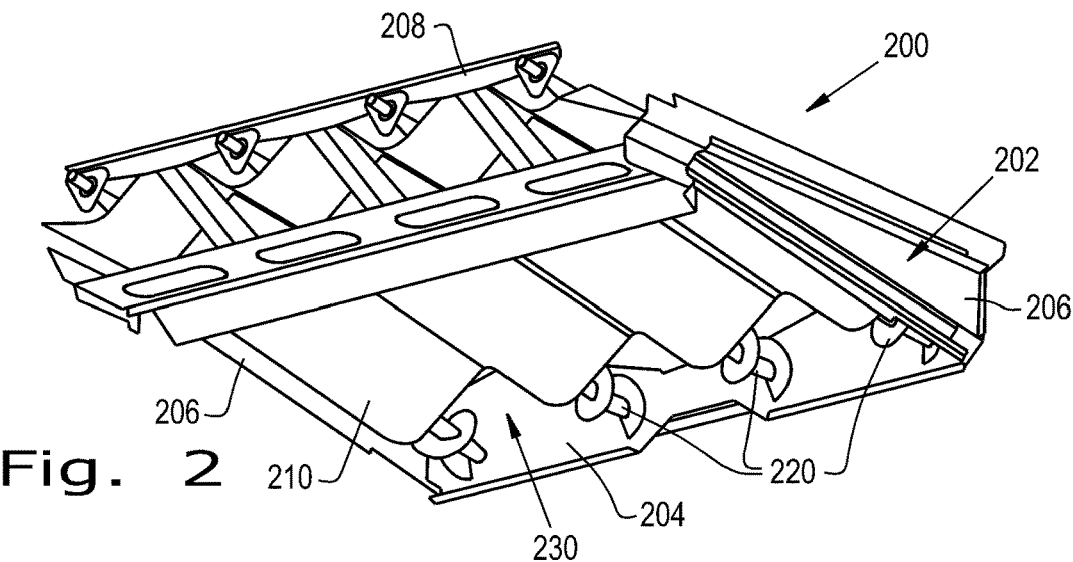
FIG. 2 illustrates a perspective view of an auger bed, the auger bed comprising a frame, a trough portion moveably coupled to the frame, and augers, in accordance with an exemplary embodiment of the present invention.

Referring now to FIG. 2, there is shown an auger trough or bed 200 according to an exemplary embodiment of the present invention. The auger bed 200 may be incorporated in an agricultural vehicle, such as in the combine harvester 110. The auger bed 200 may be positioned directly underneath the threshing rotor 140 as is the auger trough 144 in the combine harvester 110 (FIG. 1). The auger bed 200 may generally include a frame 202, a trough portion 210 movably coupled to the frame 202, and augers 220 at least partially disposed in the trough portion 210. The auger bed 200 may have a first, working position in which the auger bed 200 is in use and a second, cleaning position in which the auger bed 200 is manually or automatically cleaned to remove any unwanted material.

The frame 202 may include a front support member 204, e.g. a forward-facing wall, a pair of side support members 206, and a rear support member 208. The front and rear support members 204, 208 may include mounting holes for mounting the augers 220 as is known. The frame 202 may be composed of any suitable material such as metal.

The trough portion 210 may be moveably mounted to the frame 202. For example, the trough portion 210 may be removably, slideably, or pivotally mounted to the frame 202. The trough portion 210 may define the bottom surface of the auger bed 200 which holds the crop material in the working position. The trough portion 210 may include one or more fasteners, such as bolts, screws, or latches, which allow the trough portion 210 to be readily removed from the frame 202. Alternatively, the trough portion 210 may be pivotally fixed to the frame 202 at an end, e.g. the front, rear, or side, such that the whole trough portion 210 may swivel or pivot relative to the frame 202. Thereby, the end of the trough portion 210 opposite the pivoting end may be removably attached to the frame 202, via one or more fasteners. As a further alternative, if the trough portion 210 is slideably mounted to the frame 202, the trough portion 210 may have lip portions which correspondingly engage with and slide within grooves of the frame 202. The trough portion 210 may slide rearwardly away from the front support member 204 of the frame 202. In this regard, in the cleaning position, the trough portion 210 may rearwardly slide to expose the front portion of the augers 220 such that grain or unwanted crop material may be easily disposed. In other words, as the trough portion 210 slides rearwardly an open space 230 underneath the front portion of the augers 220 is formed and unwanted crop material may easily pass therethrough. The trough portion 210 may slide back and forth along on a track that has an axis which is parallel to the longitudinal axis of the side support members 206, or the trough portion 210 may slide on an axis which is angled relative to the longitudinal axis of the side support members 206. The trough portion 210 may be composed of any desirable material, such as metal.

The trough portion 210 may be manually or automatically moved relative to the frame 202. For instance, an operator may need to manually remove one or more fasteners, e.g. unlatching one or more latch(es), in order to detach, slide, or pivot the trough portion 210. This way, an operator may easily clean out the trough portion 210, and may subsequently reattach, slide, or pivot the trough portion 210 back to its operating position such that the trough portion 210 is fixed relative to the frame 202. Additionally, for example, one or more actuator(s) may be connected to the frame 202 and the trough portion 210 in order to automatically move the trough portion 210 (not shown). The actuator(s) may be in the form of hydraulic or electric actuators.

It should be appreciated that the trough portion 210 may include two or more sections such that one section of the trough portion 210 detaches, slides, or pivots relative to the frame 202, and thereby relative to another section of the trough portion 210. Additionally, the two or more sections of the trough portion 210 may each be moveably coupled to the frame such that the sections of the trough portion 210 move relative to one another.

The augers 220 may be rotatably mounted and supported by the frame 202 of the auger bed 200. The augers 220 may be in the form of any desired augers. The augers 220 may additionally facilitate the removal of unwanted material. For example, the augers 220 in the working position may have a first direction of rotation to transport the crop material toward the cleaning system of the agricultural vehicle, and the augers 220 in the cleaning position may rotate in a second direction of rotation opposite to the first direction of rotation in order to help move any unwanted material out of the auger bed 200 and through the resulting opening 230.

Figure 3A:
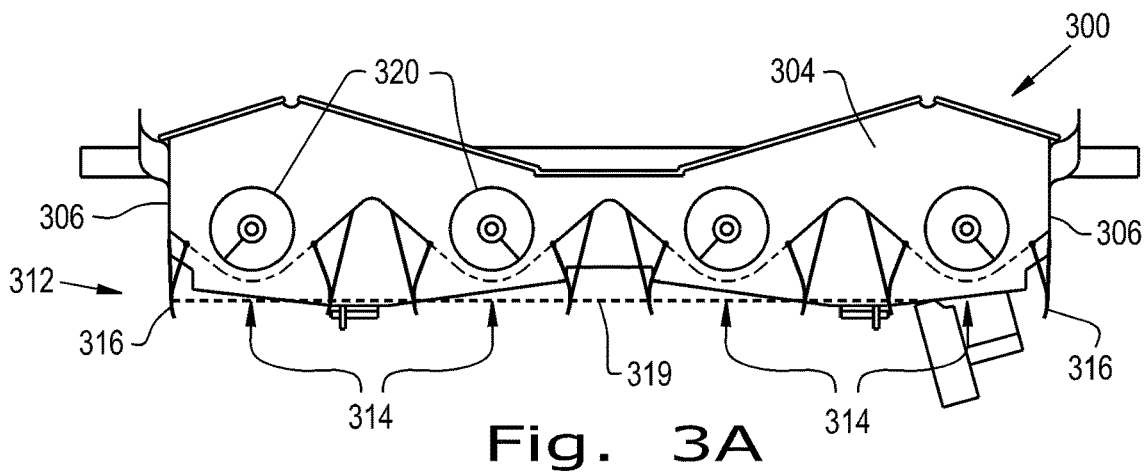
FIGS. 3A-3B illustrate another exemplary embodiment of an auger bed, the auger bed comprising a frame, a trough portion with selectively closeable doors, and augers, in accordance with an exemplary embodiment of the present invention.
Figure 3B:
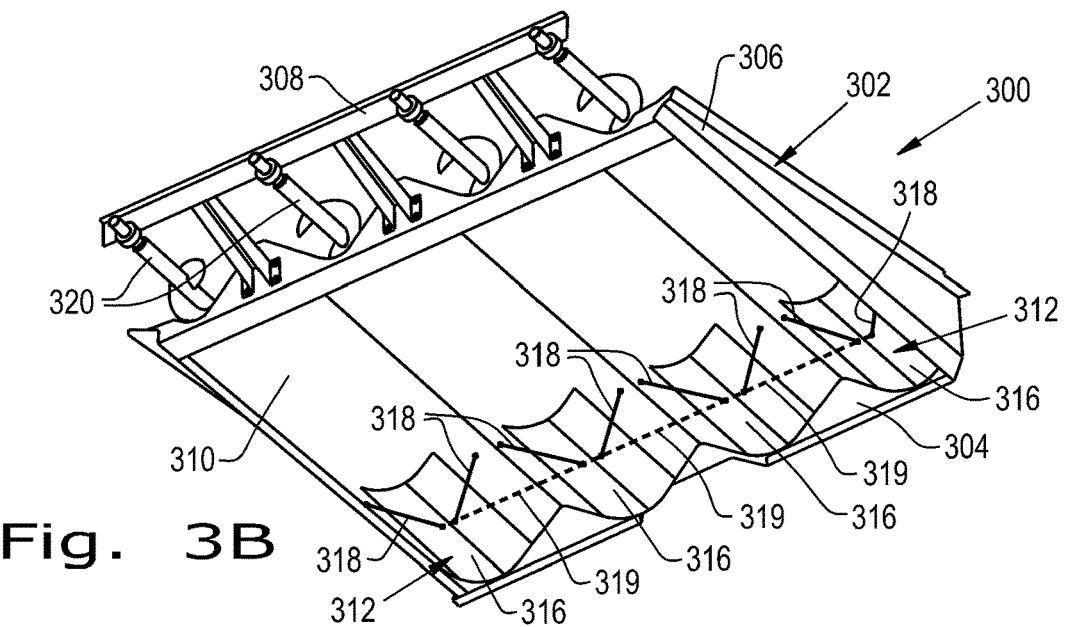

Referring now to FIGS. 3A and 3B, there is shown another exemplary embodiment of an auger bed 300 according to the present invention which generally includes a frame 302, a trough portion 310 mounted to the frame 302, and augers 320 rotatable within and at least partially disposed in the trough portion 310. The augers 320 may be rotatably mounted to the frame 302 of the auger bed 300. The augers 320 may be in the form of the augers 220 as described above. The auger bed 300 may be positioned within an agricultural vehicle 110 similar to the auger bed 200. The auger bed 300 may have a first, working position in which the auger bed 300 is in use and a second, cleaning position in which the auger bed 300 is manually or automatically cleaned to remove any unwanted material.

The frame 302 may include a front support member 304, e.g. a forward-facing wall, a pair of side support members 306, and a rear support member 308. The front support member 304 and rear beam 308 may include mounting holes for mounting the augers 320 as discussed above with respect to the auger bed 200. The frame 302 may be composed of any suitable material such as metal.

The trough portion 310 may be rigidly connected to the frame 302. The trough portion 310 may include selectively closeable doors 312 which selectively close openings 314 in the bottom surface of the trough portion 310. For example, the doors 312 of the trough portion 310 may be in the form of bomb hatch doors 312. In this regard, the trough portion 310 may be selectively operable between the working position in which the doors 312 are closed (FIG. 3B) and the cleaning position in which the doors 312 are open (FIG. 3A). The trough portion 310 may be composed of any desirable material, such as metal.

The bomb hatch doors 312 selectively open and close to allow grain and/or unwanted material to fall out of the bottom surface of the auger bed 300. The bomb hatch doors 312 are positioned at the bottom of each trough, beneath each auger 320. Each bomb hatch door 312 includes a pair of door panels 316 that are pivotally connected to the trough portion 310. The bomb hatch doors 312 may extend along a length of the trough portion 310. The bomb hatch doors 312 may extend along a portion of or the full length of the tough portion 310. The bomb hatch doors 312 may be located at any point along the trough portion 310, such as at an end, for example the front end, of the trough portion 310. As shown, the bomb hatch doors 312 have a rectangular cross-section; however, the cross-section of the bomb hatch doors 312 may be of any desired shape such as circular, hexagonal, or square. The bomb hatch doors 312 are shown to divide or split along the center longitudinal axis of each trough of the auger bed 300. However, the bomb hatch doors 312 may split along an axis which is perpendicular to the center longitudinal axis of each trough.

Each bomb hatch door 312 may also include one or more actuator(s) 318. The actuators 318 may be in the form of hydraulic or electric cylinders which automatically open and close the bomb hatch doors 312. The actuators 318 may be pivotally coupled to the bottom of the trough portion 310 and to each bomb hatch door 312, for example, connecting to each door panel 316. Alternatively or additionally, the bomb hatch doors 312 may include one or more linkage member(s) 319 which may replace or accompany the actuators 318. For instance, the linkage members 319 may be in the form of over-center linkages which connect to folding cross members that couple to the door panels 316. Also, for example, as shown in FIGS. 3A-3B, one actuator 318 may be coupled directly to a door panel 316 at the left and/or right end of the trough portion 310, and one actuator 318 may be connected to a linkage member 319 which is connected in between juxtaposed door panels 316 of adjacent bomb hatch doors 312. It should be appreciated that the actuators 318 may be mounted to a separate mounting plate connected to the frame 302 that allows for the actuators 318 to have greater leverage when opening and/or closing the bomb hatch doors 312.

Referring now to FIGS. 4A-4D, there is shown another exemplary embodiment of an auger bed 400 according to the present invention which generally includes a frame 402, a trough portion 410 mounted to the frame 402, and augers 420 rotatable within and at least partially disposed in the trough portion 410. The auger bed 400 may be positioned within an agricultural vehicle 110 as the auger beds 200, 300. The auger bed 400 may have a first, working position (FIG. 4A) in which the auger bed 400 is in operational use and a second, cleaning position (FIG. 4B) in which the auger bed 400 is manually or automatically cleaned to remove any unwanted material.

The frame 402 of the auger bed 400 may be designed as the frame 302 of the auger bed 300. Thereby, the frame 402 may include a front support member 404, side support members 406, and a rear support member 408. The augers 420 may be rotatably connected to the frame and at least partially disposed within the trough portion 410. Further, the augers 420 may be designed as the augers 220 as discussed above.

The trough portion 410 may be rigidly connected to the frame 402. The trough portion 410 has a bottom surface which may have selectively closeable openings 412 therein. For example, the bottom surface of the trough portion 410 may have cutouts 412 which can be selectively closed by one or more cover(s) 414. The trough portion 410 may be composed of any desirable material, such as metal.

Figure 4A:
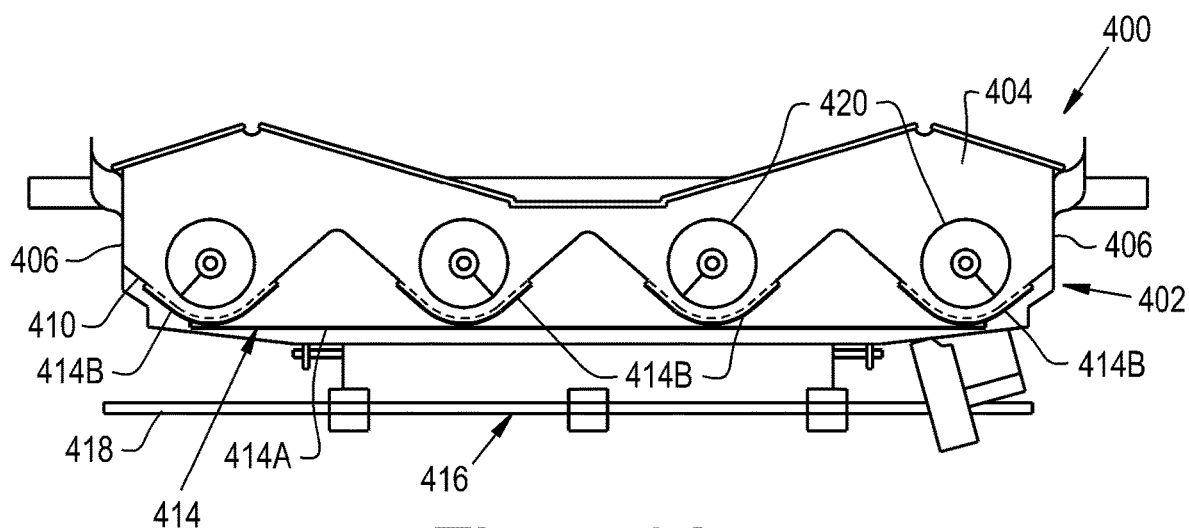
FIGS. 4A-4D illustrate another exemplary embodiment of an auger bed, the auger bed comprising a frame, a trough portion with openings on the bottom surface thereof, a pivoting cover for selectively closing the openings of the trough portion, and augers, in accordance with an exemplary embodiment of the present invention.
Figure 4B:
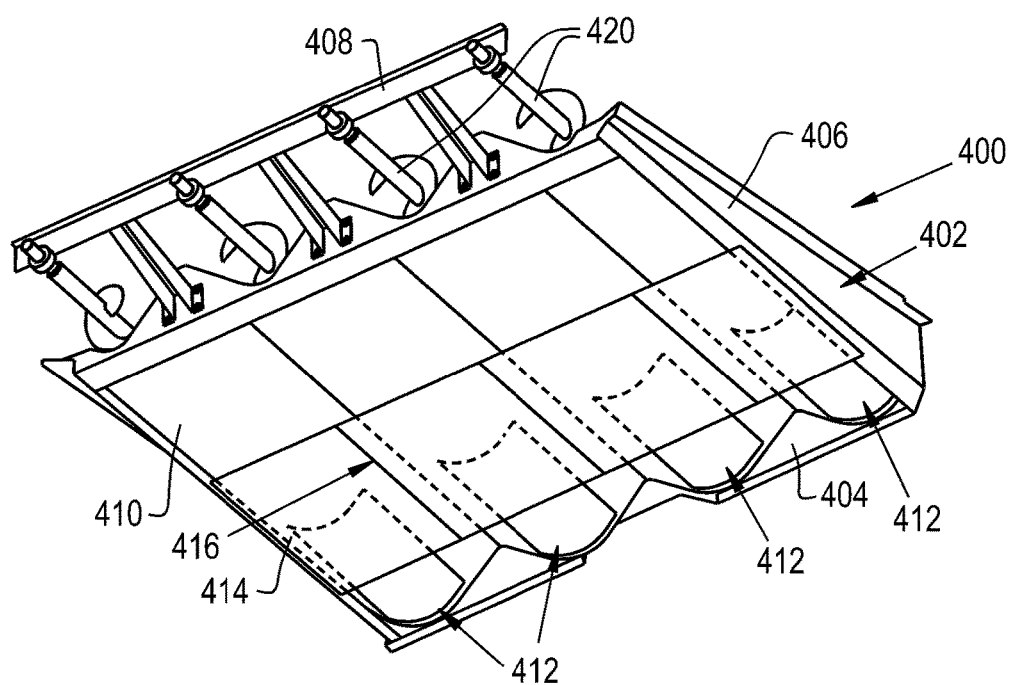

The cover 414 may be pivotably connected to the frame 402 and/or onto the underside of the trough portion 410 of the auger bed 400. The cover 414 is configured for covering and otherwise sealing the cutouts 412 in the trough portion 410 in the working position and uncovering the cutouts 412 in the cleaning position. The cover 414 may pivot downwardly and away from the underside of the auger bed 400 at pivot point P1. The cover 414 may include a substantially flat and rectangular base portion 414A that supports closing-members 414B which correspond to the cutouts 412 (FIG. 4A). The closing-members 414B may close the cutouts 412 by fitting within the perimeter of the cutouts 412 or by overlapping the cutouts 412 and creating a seal between the bottom surface of the trough portion 410 and the inner surface of the closing-members 414B. The closing-members 414B may be shaped to match the contour of the trough portion 410. The cover 414 may be composed of any desired material such as metal, e.g., sheet metal. It is conceivable to include a cover 414 without closing-members 414B. The cover 414 may be selectively fastened in the working position via one or more fasteners, such as latches.

Figure 4C:
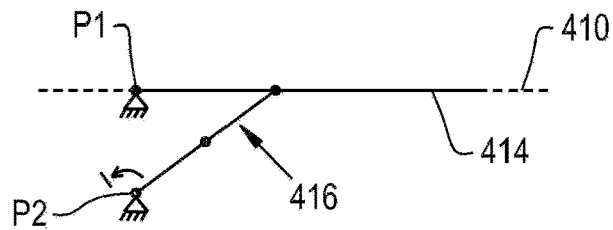
Figure 4D:
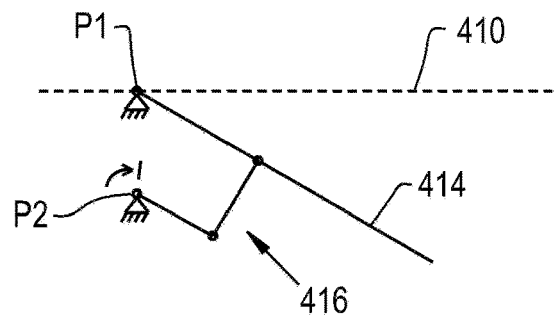

The cover 414 may further include a linkage mechanism 416 which assists in the support and movement of the cover 414. FIGS. 4C and 4D schematically illustrate the linkage mechanism 416 which may include two or more link members that pivot relative to one another and relative to the pivot point P2. The pivot point P2 of the linkage mechanism 416 may be located further below (underneath) the pivot point P1 of the cover 414. Hence, linkage mechanism 416 may be mounted to a support member 418 located underneath and connected to the trough portion 410 and/or the frame 402 of the auger bed 400. The linkage mechanism 416 may also be accompanied by one or more actuator(s) which automatically pivot the cover 414 (not shown).

Figure 5A:
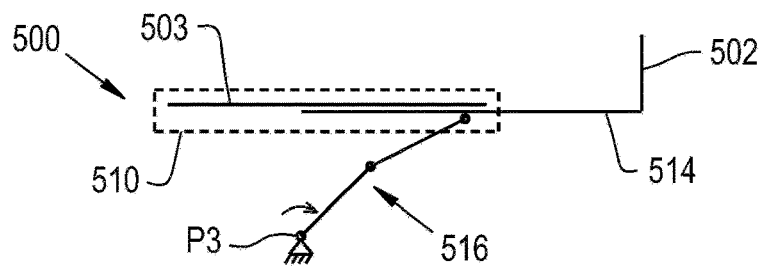
FIGS. 5A-5B illustrate another exemplary embodiment of an auger bed, the auger bed comprising a frame, a trough portion with openings on the bottom surface thereof, a sliding cover for selectively closing the openings of the trough portion, and augers, in accordance with an exemplary embodiment of the present invention.
Figure 5B:
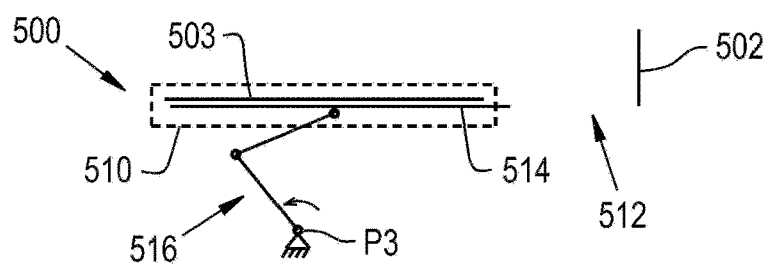

Referring now to FIGS. 5A-5B there is schematically illustrated another exemplary embodiment of an auger bed 500 in which a cover 514 slideably connects to the frame 502 and/or onto the underside of the trough portion 510 of the auger bed 500 via a linkage mechanism 516 to selectively cover and uncover an opening 512 in a working position (FIG. 5A) and a cleaning position (FIG. 5B), respectively. The auger bed 500 may be substantially designed as the auger beds 200, 300, 400 except for the trough portion 510, the sliding cover 514, and the linkage mechanism 516.

The auger bed 500 is designed so that the trough portion 510 does not extend across the entire bottom surface of the frame 502. In other words, the trough portion 510 covers only a portion of the bottom of the frame 502, underneath the augers (not shown), with the remaining portion of the bottom of the frame 502 being the opening 512. Hence, in the present exemplary embodiment, the cover 514 may slide relative to the trough portion 510 to selectively cover up the opening 512, and the cover 514 may slide rearwardly away from the front of the frame 502 to expose the opening 512.

The cover 514 may slide back and forth via a track system, illustrated by line 503 (FIG. 5A). The track system 503 may include a pair of tracks built into the frame 502 of the auger bed 500. The cover 514 may additionally include rollers which fit within the tracks and facilitate the movement of the cover 514 (not shown).

The linkage mechanism 516 may be coupled in between the bottom of the cover 514 and the trough portion 510 and/or the frame 502 of the auger bed 500. Also, the linkage mechanism 516 may be mounted to a separate mounting member which is connected to and located underneath the trough portion 510. The linkage mechanism 516 may include two or more link members which pivot relative to one another and relative to the pivot point P3. The linkage mechanism 516 may also be accompanied by one or more actuator(s) which automatically pivot the cover 514 (not shown).

Referring now to FIGS. 6A-6D, there is shown another exemplary embodiment of an auger bed 600 according to the present invention which generally includes a frame 602, a trough portion 610 mounted to the frame 602, augers 620 rotatable about an axis A1 and at least partially disposed in the trough portion 610, and rotating doors 630 pivotally connected to the frame 602. The auger bed 600 may be positioned within an agricultural vehicle 110 similar to the auger beds 200, 300, 400, 500. The auger bed 600 may have a first, working position in which the auger bed 600 is in operational use (FIG. 6B) and a second, cleaning position (FIG. 6C) in which the auger bed 600 is manually or automatically cleaned to remove any unwanted material.

Figure 6A:
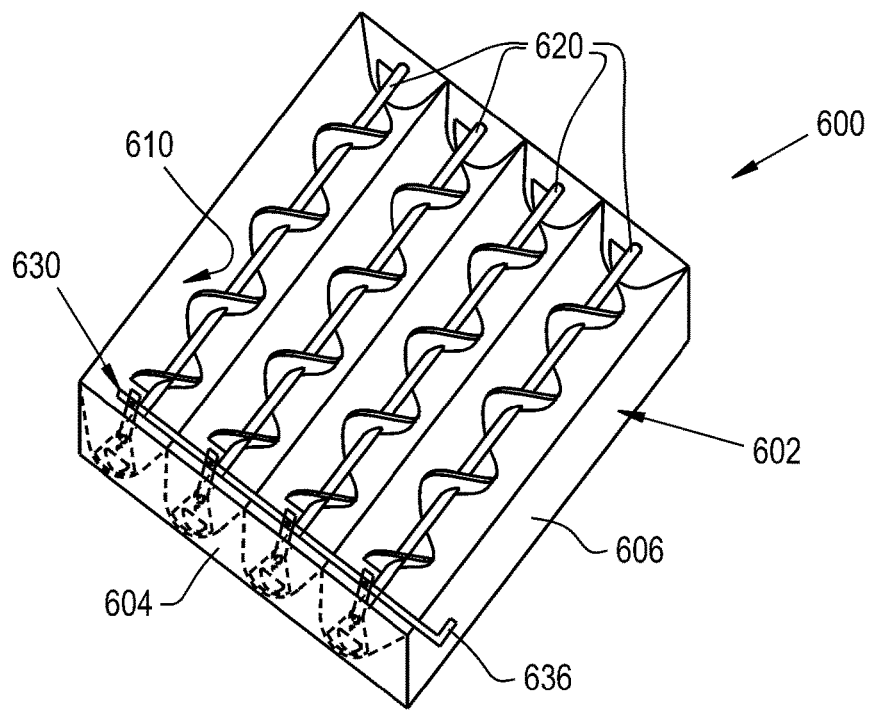
FIGS. 6A-6D illustrate another exemplary embodiment of an auger bed, the auger bed comprising a frame with openings in the front support member, a trough portion coupled to the frame, rotating doors for selectively closing the openings of the frame, and augers, in accordance with an exemplary embodiment of the present invention.

The frame 602 may include a front support member 604, e.g. a forward-facing wall, a pair of side support members 606, and a rear support member (FIG. 6A). The front support member 604 and rear beam may include mounting holes for mounting the augers 620 as discussed above with respect to the auger bed 200. The front support member 604 may additionally include openings 608 which can be selectively closed in order to allow grain or other unwanted material to pass therethrough. As shown, the cross-section of the openings 608 is semi-circular; however, the openings 608 may have any desired shape, e.g. circular, triangular, hexagonal, etc. The frame 602 may be composed of any suitable material such as metal.

The rotating doors 630 are pivotally connected to the front support member 604 of the frame 602. The rotating doors 630 have a first, closed position (FIG. 6B) and a second, open position (FIG. 6C) so that the doors 630 can selectively close the openings 608 of the front support member 604 of the frame 602. The doors 630 may be pivotally connected to the front support member 604 such that the axis of the doors 630 is parallel or coaxial with the rotational axis A1 of the augers 620. As shown, the doors 630 and the augers 620 share the common axis of rotation A1. The rotating doors 630 are positioned inside of the trough portion 610 and adjacent to the inner wall of the front support member 604. It should be appreciated however that the rotating doors 630 may be positioned outside of the trough portion 610 and adjacent to the outside wall of the front support member 604.

Each rotating door 630 has an upper coupling portion 632 and a lower blocking portion 634. The upper coupling portion 632 may pivotally couple to a rod 636, via respective receiving holes and fasteners (unnumbered). The rod 636 can selectively and synchronously actuate the doors 630. The rod 636 may be coupled to an actuator at one end in order to effect movement of the doors 630 (not shown). Alternatively, the rod 636 may be manually moved by a user. The lower blocking portion 634 is configured for selectively closing the openings 608. The lower blocking portion 634 may have a size and shape which corresponds to the size and shape of the openings 608. As shown, the blocking portion 634 has a bell-shaped design.

Figure 6B:
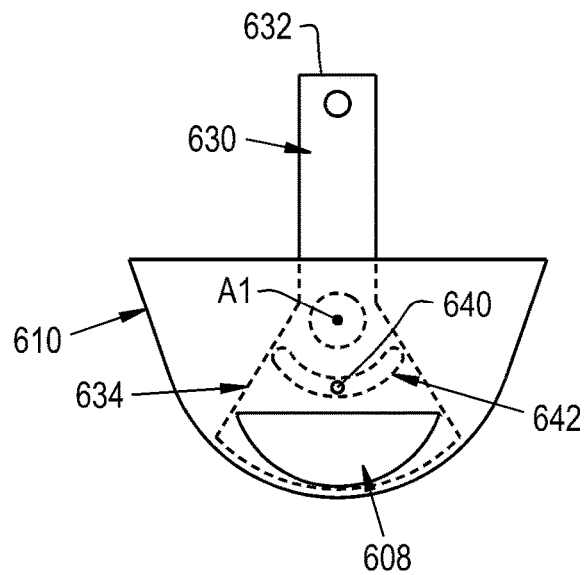
Figure 6C:
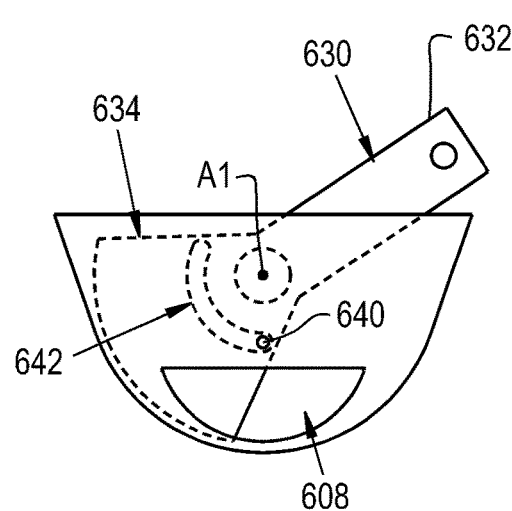
Figure 6D:
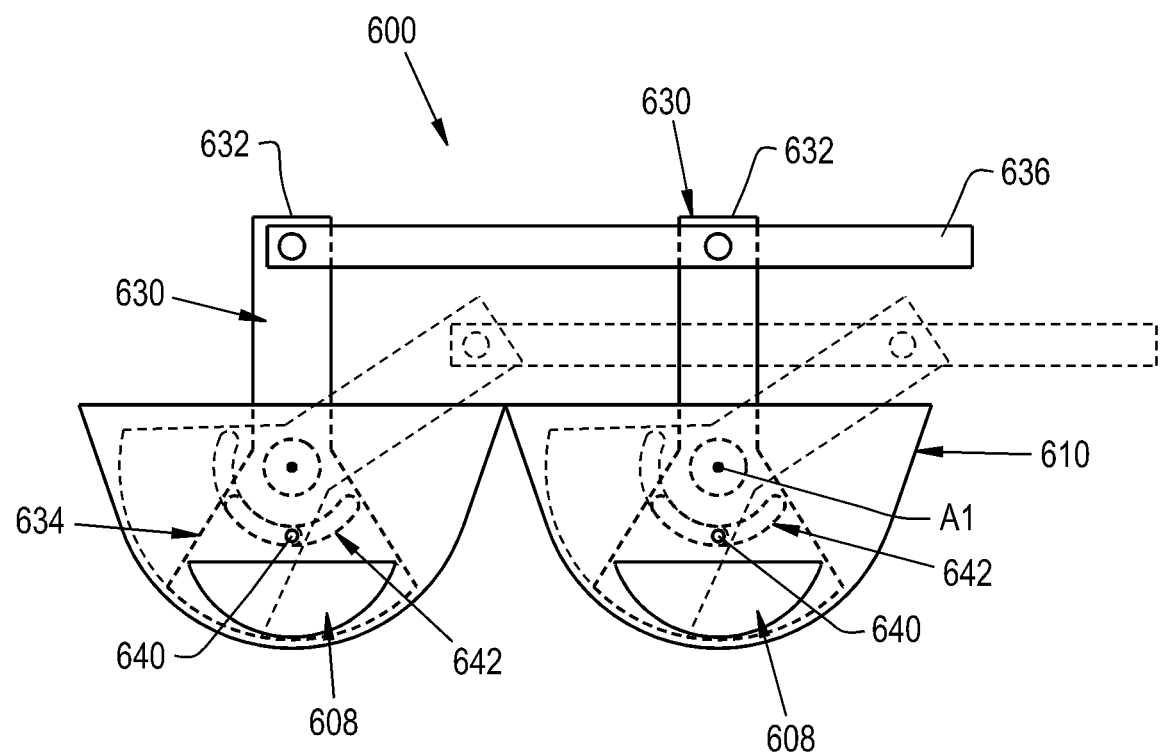

The rotational path of the doors 630 may be limited by an optional pin 640 and groove 642 connection to the front support frame 604. For example, the front support member 604 may have one or more inwardly extending pin(s) 640 and one or more of the lower blocking portion(s) 634 may have a groove 642 therein such that open position of the doors 630 is limited by the relationship of the pin(s) 640 and groove(s) 642 (FIGS. 6B and 6C). Alternatively, for example, one or more door(s) 630 may include the pin 640 and the front support member 604 may have one or more groove(s) 642 therein which correspond to the pin(s) 640 (FIG. 6D).

The augers 620 may be rotatably mounted to the frame 602 of the auger bed 600. The augers 620 may be designed and function as the augers 220, 320, 420. Thereby, the augers 620 in the working position may have a first direction of rotation to transport the crop material toward the cleaning system of the agricultural vehicle, and the augers 620 in the cleaning position may rotate in a second direction of rotation opposite to the first direction of rotation in order to help move any unwanted material out of the auger bed 600 and through the openings 608 of the front support member 604 of the frame 602.

The rotating doors 630 may be manually or automatically actuated. For example, a user may manipulate the rod 636 to move the doors 630 in between the open and closed position. Additionally, the doors 630 may be automatically adjusted by way of an actuator coupled to the rod 636 and/or by reversing the direction of rotation of the augers 620. For instance, the doors 630 may be coupled to the augers 620 by a one-way clutch, and thereby the reverse rotation of the augers 620 may cause the doors 630 to be in the open position and automatically cease closing a respective opening 608.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural vehicle, comprising:
   at least one threshing rotor; and
   an auger bed located underneath the at least one threshing rotor and having a working position and a cleaning position, the auger bed including:
   a frame comprising a front support member;
   a trough portion movably connected to the frame and having a working position and a cleaning position, the trough portion comprising a bottom surface forming a plurality of parallel auger troughs, each of the plurality of parallel auger troughs comprising a selectively closeable opening at the end of the auger trough portion adjacent the front support member; and
   a plurality of augers rotatably coupled to and supported by the frame, each auger being at least partially disposed within a respective one of the plurality of parallel auger troughs,
   wherein the trough portion is configured to move to simultaneously close the selectively closeable openings of the plurality of parallel auger troughs in the working position and simultaneously expose the selectively closeable openings of the plurality of parallel auger troughs in the cleaning position, allowing an unwanted material to pass therethrough.

2. The agricultural vehicle of claim 1, wherein the trough portion is slideably coupled to the frame.

3. The agricultural vehicle of claim 2, wherein the trough portion slides relative to the frame such that the trough portion slides rearwardly away from the front support member of the frame.

4. The agricultural vehicle of claim 1, wherein in the working position the plurality of augers have a first direction of rotation, and in the cleaning position the plurality of augers have a second direction of rotation opposite to the first direction of rotation for moving the unwanted material out of the auger bed.

5. An auger bed for an agricultural vehicle, comprising:
   a frame comprising a front support member;
   a trough portion connected to the frame and having a working position and a cleaning position, the trough portion comprising a bottom surface forming a plurality of parallel auger troughs, each of the plurality of parallel auger troughs comprising a selectively closeable opening at the end of the auger trough portion adjacent the front support member;
   a plurality of augers rotatably coupled to and supported by the frame, each auger being at least partially disposed within a respective one of the plurality of parallel auger troughs; and
   at least one door member movably connected to the trough portion and configured to simultaneously close the selectively closeable openings of the plurality of parallel auger troughs in the working position and simultaneously expose the selectively closeable openings of the plurality of parallel auger troughs in the cleaning position, allowing an unwanted material to pass therethrough.

6. The auger bed of claim 5, wherein the selectively closeable opening of each of the plurality of parallel auger troughs extends at least partially along a distance of the each of the plurality of parallel auger troughs.

7. The auger bed of claim 5, wherein the at least one door member comprises a plurality of selectively closable doors.

8. The auger bed of claim 7, wherein each door of the plurality of selectively closable doors is in the form of a bomb hatch door, wherein each bomb hatch door comprises a pair of door panels pivotally coupled to the trough portion.

9. The auger bed of claim 8, wherein each bomb hatch door further comprises at least one actuator configured for opening and closing the pair of door panels.

10. The auger bed of claim 8, further comprising a plurality of linkage members connected in between each door panel and the trough portion.

11. The auger bed of claim 5, wherein the selectively closeable opening of each of the plurality of parallel auger troughs is in the form of a cutout in the bottom surface of the trough portion.

12. The auger bed of claim 11, wherein the at least one door member comprises a plurality of movable covers, each of which is movably attached to the trough portion and configured for selectively covering the selectively closeable opening of a respective one of the plurality of parallel auger troughs such that in the working position each cover covers the selectively closeable opening of a respective one of the plurality of parallel auger troughs and in the cleaning position the each cover uncovers the selectively closeable opening of a respective one of the plurality of parallel auger troughs.

13. The auger bed of claim 12, wherein each of the plurality of movable covers is one of pivotally attached and slideably attached to the trough portion.

14. The auger bed of claim 5, wherein in the working position the plurality of augers have a first direction of rotation, and in the cleaning position the plurality of augers have a second direction of rotation opposite to the first direction of rotation for moving the unwanted material out of the auger bed.

15. The auger bed of claim 5, wherein the at least one door member comprises a single cover which is movably attached to the trough portion and configured for selectively covering the selectively closeable opening of the selectively closeable opening of each of the plurality of parallel auger troughs.

* * * * *